(12) United States Patent
Zheng et al.

(10) Patent No.: US 12,078,774 B2
(45) Date of Patent: Sep. 3, 2024

(54) DROPSONDE WITH DANDELION-LIKE STRUCTURE

(71) Applicant: BEIHANG UNIVERSITY, Beijing (CN)

(72) Inventors: Dezhi Zheng, Beijing (CN); Shuailei Zhang, Beijing (CN); Shuai Wang, Beijing (CN); Dapeng Li, Beijing (CN)

(73) Assignee: BEIHANG UNIVERSITY

( * ) Notice: Subject to any disclaimer, the term of this patent is extended or adjusted under 35 U.S.C. 154(b) by 0 days.

(21) Appl. No.: 17/792,074

(22) PCT Filed: Jun. 23, 2020

(86) PCT No.: PCT/CN2020/097712
§ 371 (c)(1),
(2) Date: Jul. 11, 2022

(87) PCT Pub. No.: WO2021/036444
PCT Pub. Date: Mar. 4, 2021

(65) Prior Publication Data
US 2024/0168197 A1    May 23, 2024

(30) Foreign Application Priority Data
Aug. 30, 2019 (CN) .......................... 201910813011.4

(51) Int. Cl.
*G01W 1/08* (2006.01)
(52) U.S. Cl.
CPC .................................. *G01W 1/08* (2013.01)

(58) Field of Classification Search
CPC ........................................................ G01W 1/08
See application file for complete search history.

(56) References Cited

U.S. PATENT DOCUMENTS

| 3,739,390 | A * | 6/1973 | Poppe, Jr. | H01Q 21/30 |
| | | | | 343/729 |
| 7,854,410 | B2 * | 12/2010 | Fanucci | B64C 39/024 |
| | | | | 244/49 |
| 10,775,532 | B2 * | 9/2020 | MacArthur | G01P 5/02 |
| 2018/0009545 | A1 * | 1/2018 | Black, Jr. | B64D 5/00 |

FOREIGN PATENT DOCUMENTS

DE    102015121703 A1 *  6/2017 ............. B64C 27/08

* cited by examiner

*Primary Examiner* — Jill E Culler
(74) *Attorney, Agent, or Firm* — Jose Cherson Weissbrot

(57) ABSTRACT

A dropsonde with a dandelion-like structure includes a support system, a rotor wing system, a rotor wing restraint system, a sensing main control system and an electrical damping system, the support system further comprising a hollow upper strut, a hollow lower strut, an upper disc fixedly connected to top of the upper strut and a lower disc fixedly connected to top of the lower strut, the upper strut is partially inserted into the lower strut, and the upper parts of the upper disc and the upper strut are exposed outside the lower strut; wherein the rotor wing system includes a plurality of upper rotor wings, a plurality of lower rotor wings, a plurality of upper springs, a plurality of lower springs, a plurality of upper connecting members and a plurality of lower connecting members.

8 Claims, 8 Drawing Sheets

DROPSONDE WITH DANDELION-LIKE STRUCTURE

TECHNICAL FIELD

The present disclosure relates to the technical field for measuring meteorological parameters in an airport information system, specifically meteorological parameters of a typhoon and other extreme conditions, in particular to a dropsonde with a dandelion-like structure.

BACKGROUND

Typhoon is a catastrophic weather system with strong destructive power. On average, more than 60 typhoons occur in the world every year, and 7.6 typhoons occur in China every year. Typhoon is a deep low atmospheric pressure system with a low central atmospheric pressure that a remarkable airflow converging to the center is at a lower layer, and a top airflow diffuses outwards. With a complex structure, the typhoon is divided into three areas: a typhoon eye area, a cloud wall area and a spiral rain area from the center. Typhoon is typically accompanied by strong convective weather, causing significant damages. By monitoring various parameters of the typhoon in real time as well as mastering the typhoon level, scale, development situation and movement path, Typhoon can be reasonably evaluated, allowing precautions to be taken in advance thus minimizing losses.

A sonde is an instrument capable of measuring physical parameters of atmosphere at different heights and its vertical distribution law. The existing dropsonde typically adopts an airbag structure filled with helium, which is suitable for working in a relatively smooth weather. Due to rough environment inside typhoon, strong wind speed, including various cloud, water and ice grains, and its great destructive power, the airbag structure of the existing dropsonde can be easily damaged, causing the sonde to not reach the predetermined hang time, wasting manpower and material resources, and also delaying preparation for the disaster prevention.

For the existing dropsonde, a film of its airbag structure is made of polyethylene, usually the reliability of the sonde is increased by increasing the thickness of the polyethylene film. But even so, the existing dropsonde is still not suitable for typhoon detection. Therefore, providing a dropsonde which cannot be easily damaged in typhoon is of great significance.

SUMMARY

For this purpose, the present disclosure provides a dropsonde with a dandelion-like structure, which is not easily damaged in the typhoon.

Therefore, the present disclosure provides a dropsonde with a dandelion-like structure, including a support system (1), a rotor wing system (2), a rotor wing restraint system (3), a sensing main control system (4) and an electrical damping system (5), wherein The support system (1) includes a hollow upper strut (6), a hollow lower strut (7), an upper disc (8) fixedly connected to a top of the upper strut (6) and a lower disc (9) fixedly connected to a top of the lower strut (7), wherein the upper strut (6) is partially inserted into the lower strut (7), and upper parts of the upper disc (8) and the upper strut (6) are exposed outside the lower strut (7);

The rotor wing system (2) includes a plurality of upper rotor wings (10), a plurality of lower rotor wings (11), a plurality of upper springs (12) corresponding to each upper rotor wing (10) one by one, a plurality of lower springs (13) corresponding to each lower rotor wing (11) one by one, a plurality of upper connecting members (14) corresponding to each upper rotor wing (10) one by one and a plurality of lower connecting members (15) corresponding to each lower rotor wing (11) one by one, wherein an inclination direction of each upper rotor wing (10) is opposite to that of each lower rotor wing (11); one end of each upper spring (12) is fixedly connected to the corresponding upper rotor wing (10) while the other end is fixedly connected to the upper strut (6); one end of each lower spring (13) is fixedly connected to the corresponding lower rotor wing (11) while the other end is fixedly connected to the lower strut (7); each upper connecting member (14) includes an upper dip angle adjusting rod (16), an upper angle limiting cylinder (17) and an upper rotor wing adjusting ring (18), wherein the upper dip angle adjusting rod (16) in each upper connecting member (14) is fixedly connected to the corresponding upper rotor wing (10), the upper angle limiting cylinder (17) in each upper connecting member (14) is fixedly connected to the upper rotor wing adjusting ring (18), a plurality of upper dip angle adjusting marbles (19) that are arranged along an extension direction of the upper dip angle adjusting rod (16) are provided on the surface of the upper dip angle adjusting rod (16), a plurality groups of upper angle limiting holes (20) that are arranged along a circumferential direction of the upper angle limiting cylinder (17) are formed in the upper angle limiting cylinder (17), each group of upper angle limiting holes (20) corresponds to each upper dip angle adjusting marble (19) one by one, the upper dip angle adjusting rod (16) is inserted into the upper angle limiting cylinder (17), each upper dip angle adjusting marble (19) pops up from one group of upper angle limiting holes (20) to realize locking an inclination angle of the corresponding upper rotor wing (10), and each upper dip angle adjusting marble (19) pops up from different groups of upper angle limiting holes (20) to realize adjusting the inclination angle of the corresponding upper rotor wing (10); a plurality of upper connecting holes (21) corresponding to each upper rotor wing adjusting ring (18) one by one are formed at a position where the upper disc (8) closes to an edge, each upper rotor wing adjusting ring (18) is rotationally connected to the upper disc (8) through the corresponding upper connecting hole (21), each upper rotor wing adjusting ring (18) is provided with an upper rotor wing fixing hole (22), the upper disc (8) is provided with a plurality of upper rotor wing fixing marbles (23) which correspond to each upper rotor wing fixing hole (22) one by one, and each upper rotor wing fixing marble (23) pops up from the corresponding upper rotor wing fixing hole (22) to realize locking an opening state of the corresponding upper rotor wing (10); each lower connecting member (15) includes an lower dip angle adjusting rod (24), a lower angle limiting cylinder (25) and a lower rotor wing adjusting ring (26), wherein the lower dip angle adjusting rod (24) in each lower connecting member (15) is fixedly connected to the corresponding lower rotor wing (11), the lower angle limiting cylinder (25) in each lower connecting member (15) is fixedly connected to the lower rotor wing adjusting ring (26), a plurality of lower dip angle adjusting marbles (27) that are arranged along an extension direction of the lower dip angle adjusting rod (24) are provided on the surface of the lower dip angle adjusting rod (24), a plurality groups of lower angle limiting holes (28) that are arranged along a circumferential direction of the lower angle limiting cylinder (25) are formed in the lower angle limiting cylinder (25), each group of lower angle limiting holes (28) corresponds to each lower dip angle adjusting marble (27) one by one, the lower dip angle adjusting rod (24) is inserted into the lower angle limiting cylinder (25), each lower dip angle adjusting marble (27) pops up from one group of lower angle limiting holes (28) to realize locking the inclination angle of the corresponding lower rotor wing (11), and each lower dip angle adjusting marble (27) pops up from different groups of lower angle limiting holes (28) to realize adjusting the inclination angle of the corresponding lower rotor wing (11); a plurality of lower connecting holes (29) corresponding to each lower rotor wing adjusting ring (26) are formed at a position where the lower disc (9) closes to an edge, each lower rotor wing adjusting ring (26) is rotationally connected to the lower disc (9) through the corresponding lower connecting hole (29), each lower rotor wing adjusting ring (26) is provided with a lower rotor wing fixing hole (30), the lower disc (9) is provided with a plurality of lower rotor wing fixing marbles (31) which correspond to each lower rotor wing fixing hole (30) one by one, and each lower rotor wing fixing marble (31) pops up from the corresponding lower rotor wing fixing hole (30) to realize locking an opening state of the corresponding lower rotor wing (11);

The rotor wing restraint system (3) includes a restraint ring (32), a restraint rod (33), a restraint frame (34), through which the restraint ring (32) is fixedly connected to the top of the restraint rod (33), a straight tooth (35) fixedly connected to the bottom of the restraint rod (33), a gear (36) meshing with the straight tooth (35), a stepping motor (37) fixedly connected to the gear (36), and a restraint controller (38) electrically connected to the stepping motor (37), wherein the restraint rod (33) is partially inserted into the upper strut (6), upper parts of the restraint ring (32), the restraint frame (34) and the restraint rod (33) are exposed outside the upper strut (6), the straight tooth (35), the gear (36), the stepping motor (37) and the restraint controller (38) are located inside the upper strut (6), and an outer wall of the restraint controller (38) is fixedly connected to an inner wall of the upper strut (6); the restraint controller (38) is configured to control the rotation of the stepping motor (37) under the control of the sensing main control system (4) and to drive the gear (36) to rotate, the restraint ring (32) is driven to move away from or closely to the rotor wing system (2) through meshing drive of the gear (36) and the straight tooth (35), so as to open each upper rotor wing (10) and each lower rotor wing (11) or realize locking a closing state of each upper rotor wing (10) and each lower rotor wing (11);

The sensing main control system (4) is fixedly connected to the bottom of the lower strut (7) and includes a sensor and a micro controller which are connected electrically, wherein the sensor is configured to collect position information of the sonde in real time, to collect temperature information, humidity information, wind information and atmospheric pressure information after the sonde is confirmed to reach a predetermined height and to send these information to the micro controller; the micro controller is configured to send a control signal to the restraint controller (38) after the sonde reaches the predetermined height, the restraint controller (38) controls the rotation of the stepping motor (37) and drives the gear (36) to rotate, the restraint ring (32) is driven to move away from the rotor wing system (2) through meshing drive of the gear (36) and the straight tooth (35), so as to open each upper rotor wing (10) and each lower rotor wing (11) and send the received temperature information, humidity information, wind information and atmospheric pressure information to the ground;

The electrical damping system (5) includes a DC motor (39) located in the lower strut (7) and a simulated resistor accessed in a coil of the DC motor (39), wherein a rotary shaft of the DC motor (39) is fixedly connected to the bottom of the upper strut (6) by a connector (40), and an outer wall of the DC motor (39) is fixedly connected to an inner wall of the lower strut (7); and a control end of the simulated resistor is electrically connected to the micro controller, which is configured to control the descending speed of the sonde by controlling a resistance value of the simulated resistor.

In a possible implementation mode, each upper rotor wing (10) has the same inclination angle in the dropsonde provided by the present disclosure.

In a possible implementation mode, each lower rotor wing (11) has the same inclination angle in the dropsonde provided by the present disclosure.

In a possible implementation mode, a spherical crown structure is enclosed by the restraint frame (34) and the restraint ring (32) in the dropsonde provided by the present disclosure.

In a possible implementation mode, a shell of the sensing main control system (4) is bullet-shaped in the dropsonde provided by the present disclosure.

The dropsonde provided by the present disclosure adopts a dandelion-like structure. In a bad environment, such as the typhoon, the upper and lower rotor wings of the sonde are not easily damaged, even a small amount of rotor wings are damaged, the normal use of the sonde can be ensured. Therefore, dropsonde is suitable for detecting the bad environment, such as the typhoon. When the upper and lower rotor wings are closed, the sonde is launched to a predetermined height. During a launching process, the upper and lower rotor wings are closed so that the sonde body is easier to keep the straight flight. After the sonde reaches the predetermined height, the upper and lower rotor wings may be opened automatically, and then fall slowly. An upper and lower double-layer rotor wing structure is adopted, and the upper and lower rotor wings have the opposite inclination directions and generate the opposite airflow under the effect of an external environment, so that the upper and lower rotor wings have the opposite rotation directions, thereby increasing air resistance and obtaining longer hang time for the sonde. Moreover, the descending speed of the sonde may be controlled by adjusting the inclination angle of the upper and lower rotor wings, so that the sonde can obtain ideal hang time. In addition, the resistance value of the simulated resistor may be adjusted by the micro controller, so as to change the received relative torque when the upper and lower rotor wings rotate and change the relative rotation speed of the upper and lower rotor wings, thereby realizing the control of the descending speed of the sonde and obtaining the ideal hang time for the sonde.

DETAILED DESCRIPTION OF THE EMBODIMENTS

The technical solutions in the implementation mode of the present disclosure are clearly and completely elaborated below in combination with the drawings. It is apparent that the described implementation modes are only examples, instead of limiting the present disclosure.

Figure 1:
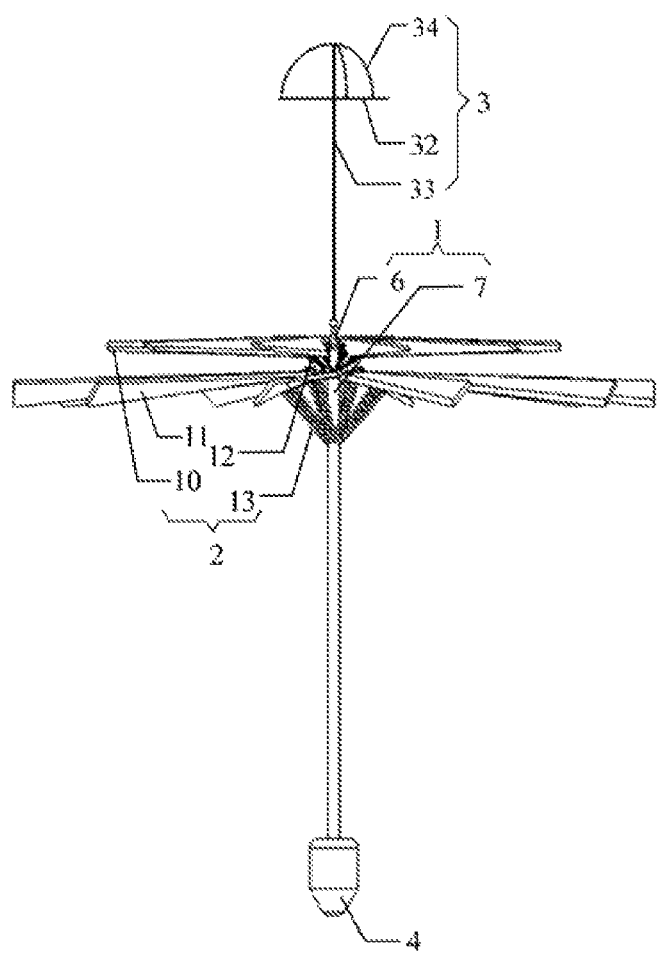
FIG. 1 is a structural schematic diagram of a dropsonde with a dandelion-like structure when a rotor wing system is opened in the present disclosure.
Figure 2:
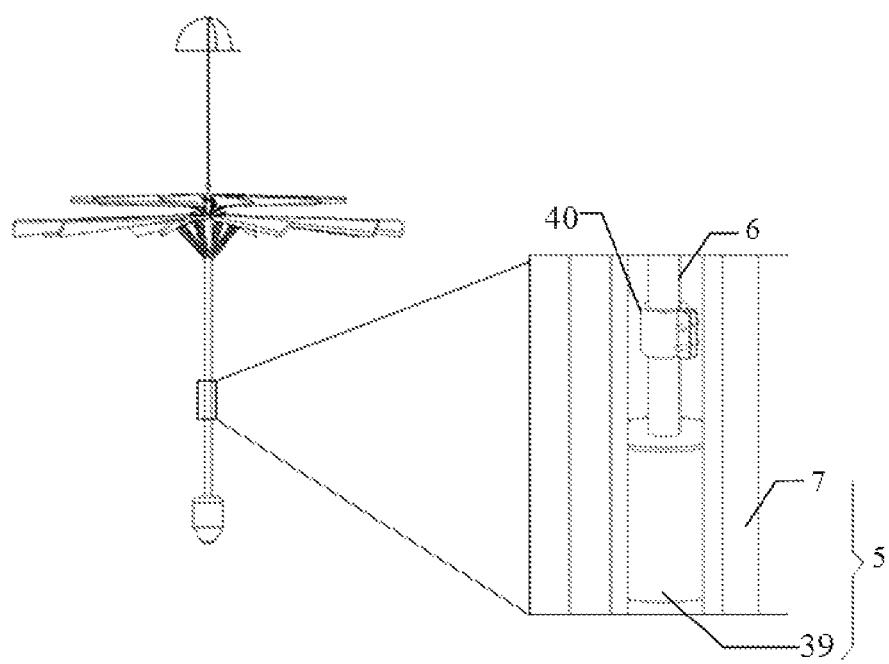
FIG. 2 is a structural schematic diagram of an electrical damping system in a dropsonde with a dandelion-like structure in the present disclosure.
Figure 3:
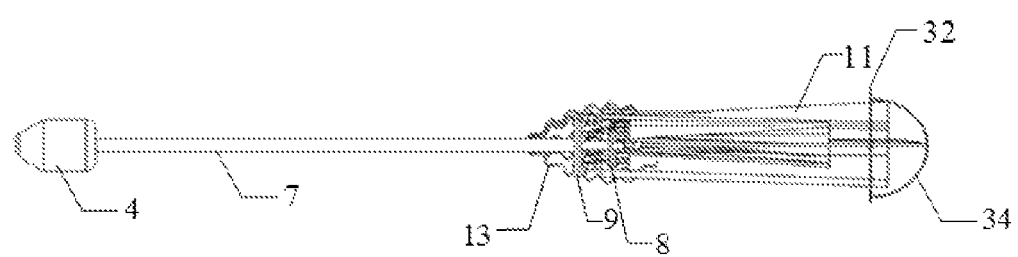
FIG. 3 is a structural schematic diagram of a dropsonde with a dandelion-like structure when a rotor wing system is closed in the present disclosure.
Figure 4:
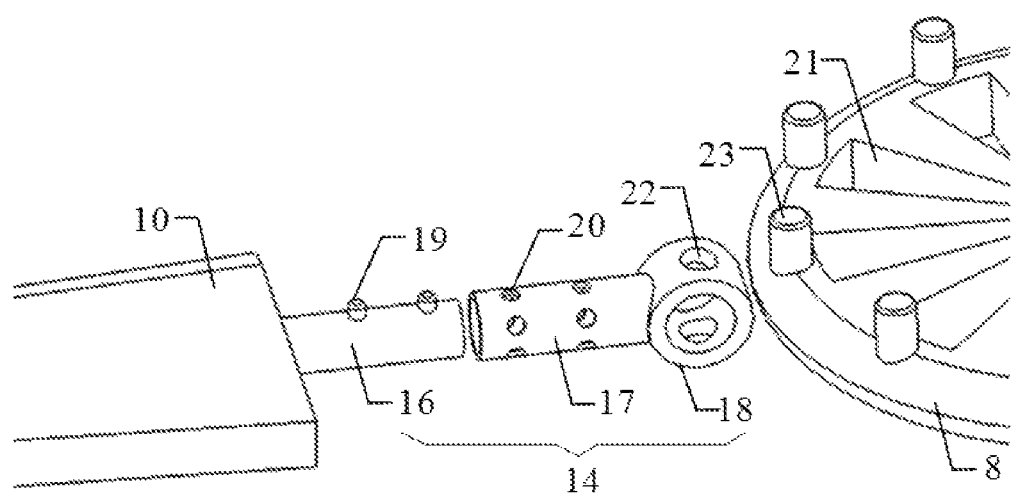
FIG. 4 is a structural schematic diagram of a dropsonde with a dandelion-like structure when an upper connecting member is disconnected in the present disclosure.
Figure 5:
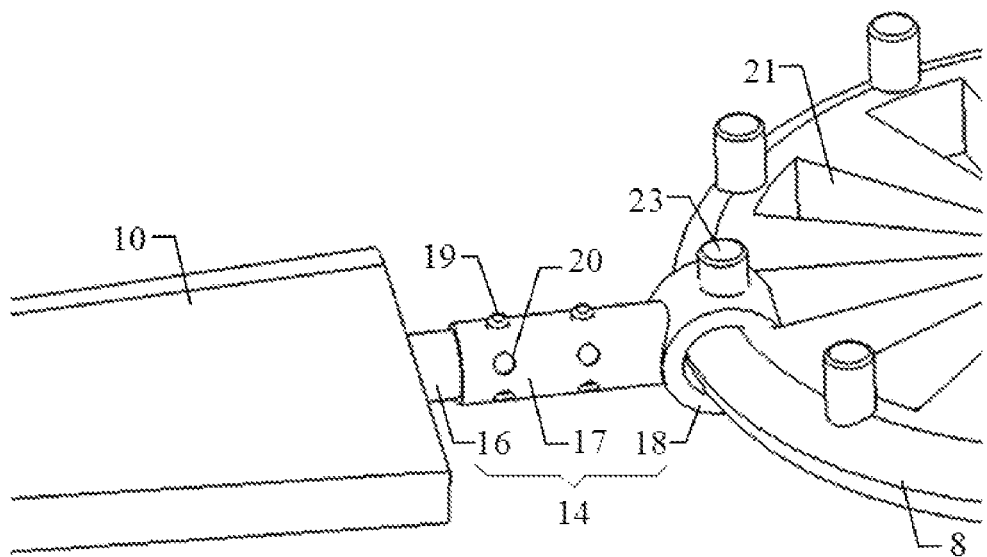
FIG. 5 is a structural schematic diagram of a dropsonde with a dandelion-like structure when an upper connecting member is connected in the present disclosure.
Figure 6:
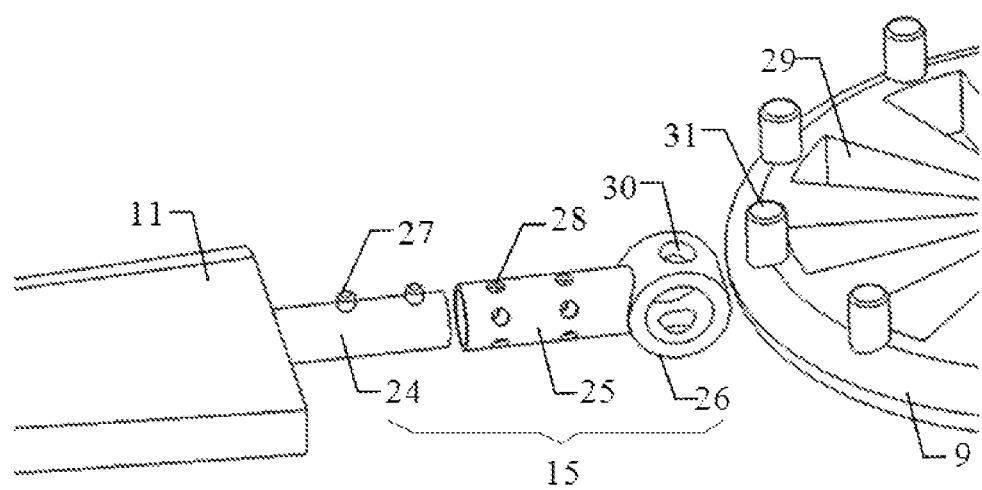
FIG. 6 is a structural schematic diagram of a dropsonde with a dandelion-like structure when a lower connecting member is disconnected in the present disclosure.
Figure 7:
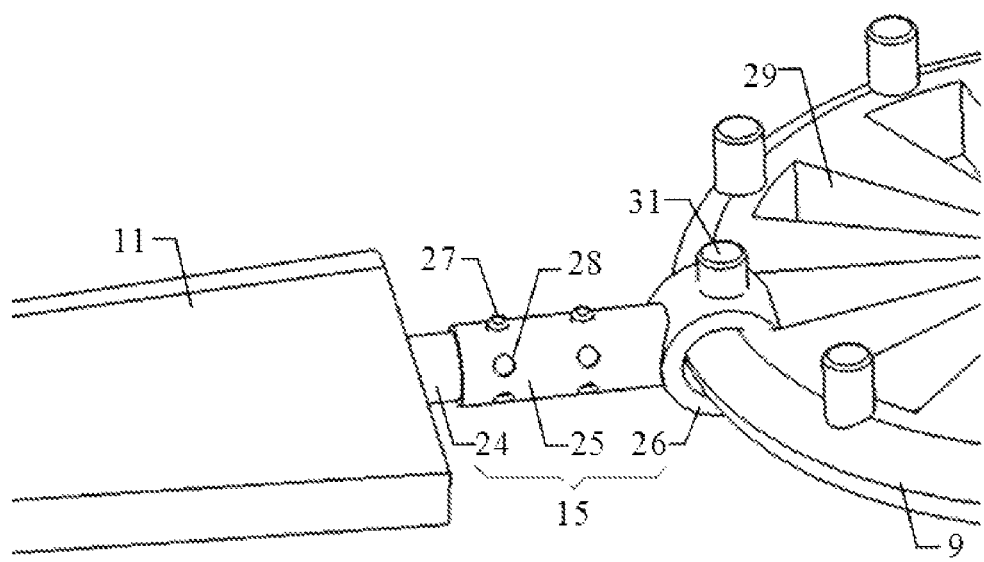
FIG. 7 is a structural schematic diagram of a dropsonde with a dandelion-like structure when a lower connecting member is connected in the present disclosure.
Figure 8:
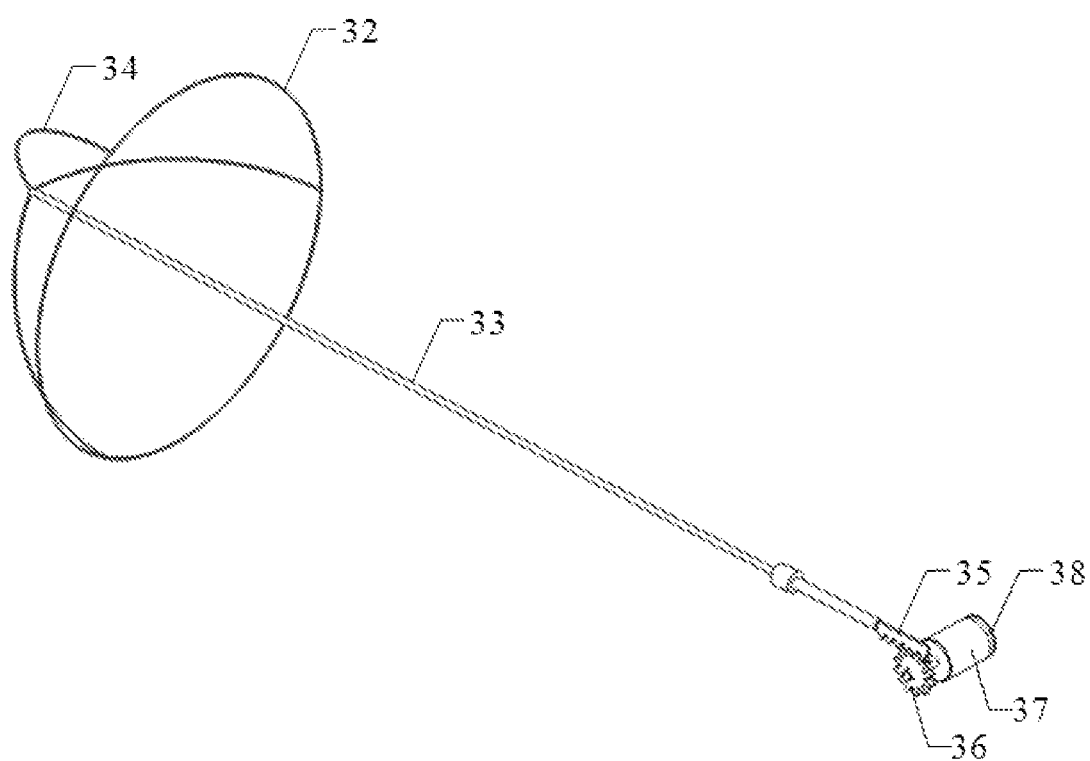
FIG. 8 is a structural schematic diagram of a restraint system in a dropsonde with a dandelion-like structure in the present disclosure.

The dropsonde with the dandelion-like structure provided by the present disclosure, as shown in FIG. 1 and FIG. 2, includes a support system 1, a rotor wing system 2, a rotor wing restraint system 3, a sensing main control system 4 and an electrical damping system 5, wherein The support system 1, as shown in FIG. 1 and FIG. 3, includes a hollow upper strut 6, a hollow lower strut 7, an upper disc 8 fixedly connected to a top of the upper strut 6 and a lower disc 9 fixedly connected to a top of the lower strut 7, wherein the upper strut 6 is partially inserted into the lower strut 7, and upper parts of the upper disc 8 and the upper strut 6 are exposed outside the lower strut 7;

The rotor wing system 2, as shown in FIG. 1 and FIG. 0.4-FIG. 7, includes a plurality of upper rotor wings 10, a plurality of lower rotor wings 11, a plurality of upper springs 12 corresponding to each upper rotor wing 10 one by one, a plurality of lower springs 13 corresponding to each lower rotor wing 11 one by one, a plurality of upper connecting members 14 corresponding to each upper rotor wing 10 one by one and a plurality of lower connecting members 15 corresponding to each lower rotor wing 11 one by one, as shown in FIG. 1, an inclination direction of each upper rotor wing 10 is opposite to that of each lower rotor wing 11; one end of each upper spring 12 is fixedly connected to the corresponding upper rotor wing 10 while the other end is fixedly connected to the upper strut 6; one end of each lower spring 13 is fixedly connected to the corresponding lower rotor wing 11 while the other end is fixedly connected to the lower strut 7; as shown in FIG. 4, each upper connecting member 14 includes an upper dip angle adjusting rod 16, an upper angle limiting cylinder 17 and an upper rotor wing adjusting ring 18, wherein the upper dip angle adjusting rod 16 in each upper connecting member 14 is fixedly connected to the corresponding upper rotor wing 10, the upper angle limiting cylinder 17 in each upper connecting member 14 is fixedly connected to the upper rotor wing adjusting ring 18, a plurality of upper dip angle adjusting marbles 19 that are arranged along an extension direction of the upper dip angle adjusting rod 16 are provided on the surface of the upper dip angle adjusting rod 16, a plurality groups of upper angle limiting holes 20 that are arranged along a circumferential direction of the upper angle limiting cylinder 17 are formed in the upper angle limiting cylinder 17, each group of upper angle limiting holes 20 corresponds to each upper dip angle adjusting marble 19 one by one, as shown in FIG. 5, the upper dip angle adjusting rod 16 is inserted into the upper angle limiting cylinder 17, each upper dip angle adjusting marble 19 pops up from one group of upper angle limiting holes 20 to realize locking an inclination angle of the corresponding upper rotor wing 10, and each upper dip angle adjusting marble 19 pops up from different groups of upper angle limiting holes 20 to realize adjusting the inclination angle of the corresponding upper rotor wing 10; a plurality of upper connecting holes 21 corresponding to each upper rotor wing adjusting ring 18 are formed at a position where the upper disc 8 closes to an edge, each upper rotor wing adjusting ring 18 is rotationally connected to the upper disc 8 through the corresponding upper connecting hole 21, each upper rotor wing adjusting ring 18 is provided with an upper rotor wing fixing hole 22, the upper disc 8 is provided with a plurality of upper rotor wing fixing marbles 23 which correspond to each upper rotor wing fixing hole 22 one by one, and each upper rotor wing fixing marble 23 pops up from the corresponding upper rotor wing fixing hole 22 to realize locking an opening state of the corresponding upper rotor wing 10; as shown in FIG. 6, each lower connecting member 15 includes an lower dip angle adjusting rod 24, a lower angle limiting cylinder 25 and a lower rotor wing adjusting ring 26, wherein the lower dip angle adjusting rod 24 in each lower connecting member 15 is fixedly connected to the corresponding lower rotor wing 11, the lower angle limiting cylinder 25 in each lower connecting member 15 is fixedly connected to the lower rotor wing adjusting ring 26, a plurality of lower dip angle adjusting marbles 27 that are arranged along an extension direction of the lower dip angle adjusting rod 24 are provided on the surface of the lower dip angle adjusting rod 24, a plurality groups of lower angle limiting holes 28 that are arranged along a circumferential direction of the lower angle limiting cylinder 25 are formed in the lower angle limiting cylinder 25, each group of lower angle limiting holes 28 corresponds to each lower dip angle adjusting marble 27 one by one, as shown in FIG. 7, the lower dip angle adjusting rod 24 is inserted into the lower angle limiting cylinder 25, each lower dip angle adjusting marble 27 pops up from one group of lower angle limiting holes 28 to realize locking the inclination angle of the corresponding lower rotor wing 11, and each lower dip angle adjusting marble 27 pops up from different groups of lower angle limiting holes 28 to realize adjusting the inclination angle of the corresponding lower rotor wing 11; a plurality of lower connecting holes 29 corresponding to each lower rotor wing adjusting ring 26 one by one are formed at a position where the lower disc 9 closes to an edge, each lower rotor wing adjusting ring 26 is rotationally connected to the lower disc 9 through the corresponding lower connecting hole 29, each lower rotor wing adjusting ring 26 is provided with a lower rotor wing fixing hole 30, the lower disc 9 is provided with a plurality of lower rotor wing fixing marbles 31 which correspond to each lower rotor wing fixing hole 30 one by one, and each lower rotor wing fixing marble 31 pops up from the corresponding lower rotor wing fixing hole 30 to realize locking an opening state of the corresponding lower rotor wing 11;

The rotor wing restraint system 3, as shown in FIG. 8, includes a restraint ring 32, a restraint rod 33, a restraint frame 34, through which the restraint ring 32 is fixedly connected to the top of the restraint rod 33, a straight tooth 35 fixedly connected to the bottom of the restraint rod 33, a gear 36 meshing with the straight tooth 35, a stepping motor 37 fixedly connected to the gear 36, and a restraint controller 38 electrically connected to the stepping motor 37, wherein the restraint rod 33 is partially inserted into the upper strut 6, upper parts of the restraint ring 32, the restraint frame 34 and the restraint rod 33 are exposed outside the upper strut 6, the straight tooth 35, the gear 36, the stepping motor 37 and the restraint controller 38 are located inside the upper strut 6, and an outer wall of the restraint controller 38 is fixedly connected to an inner wall of the upper strut 6; the restraint controller 38 is configured to control the rotation of the stepping motor 37 under the control of the sensing main control system 4 and to drive the gear 36 to rotate, the restraint ring 32 is driven to move away from or closely to the rotor wing system 2 through meshing drive of the gear 36 and the straight tooth 35, so as to open each upper rotor wing 10 and each lower rotor wing 11 or realize locking a closing state of each upper rotor wing 10 and each lower rotor wing 11; and as shown in FIG. 3, the restraint ring 32 realizes locking the closing state of each upper rotor wing 10 and each lower rotor wing 11;

As shown in FIG. 1, the sensing main control system 4 is fixedly connected to the bottom of the lower strut 7 and includes a sensor and a micro controller which are connected electrically, wherein the sensor is configured to collect position information of the sonde in real time, to collect temperature information, humidity information, wind information and atmospheric pressure information after the sonde is confirmed to reach a predetermined height and to send these information to the micro controller; the micro controller is configured to send a control signal to the restraint controller 38 after the sonde reaches the predetermined height, the restraint controller 38 controls the rotation of the stepping motor 37 and drives the gear 36 to rotate, the restraint ring 32 is driven to move away from the rotor wing system 2 through meshing drive of the gear 36 and the straight tooth 35, so as to open each upper rotor wing 10 and each lower rotor wing 11 and send the received temperature information, humidity information, wind information and atmospheric pressure information to the ground;

The electrical damping system 5, as shown in FIG. 2, includes a DC motor 39 located in the lower strut 7 and a simulated resistor accessed in a coil of the DC motor 39, wherein a rotary shaft of the DC motor 39 is fixedly connected to the bottom of the upper strut 6 by a connector 40, and an outer wall of the DC motor 39) is fixedly connected to an inner wall of the lower strut 7; and a control end of the simulated resistor is electrically connected to the micro controller, which is configured to control the descending speed of the sonde by controlling a resistance value of the simulated resistor.

The working principle of the dropsonde provided by the present disclosure is described in details below. Each upper rotor wing 10 and each lower rotor wing 11 are artificially closed, namely, each upper rotor wing 10 and each lower rotor wing 11 are artificially restrained to a state that the upper strut 6 is parallel to the lower strut 7, at this time, each upper spring 12 and each lower spring 13 are in a stretching state, the micro controller controls the rotation of the stepping motor 37 and drives the gear 36 to rotate, the restraint ring 32 is driven to move in a direction closed to the rotor wing system 2 by the meshing drive of the gear 36 and the straight tooth 35, so as to realize locking the closed state of each upper rotor wing 10 and each lower rotor wing 11. As shown in FIG. 3, in the closed state of each upper rotor wing 10 and each lower rotor wing 11, the sonde is launched to a predetermined height, the micro controller controls the rotation of the stepping motor 37 and drives the gear 36 to rotate, the restraint ring 32 is driven to move in a direction away from the rotor wing system 2 by the meshing drive of the gear 36 and the straight tooth 35, so each upper rotor wing 10 and each lower rotor wing 11 break away from the constraint of the restraint ring 32, and are opened under the tension effect of the corresponding upper spring 12 and the corresponding lower spring 13, namely, the state that each upper rotor wing 10 and each lower rotor wing 11 are vertical to the upper strut 6 and the lower strut 7, and the locking of the opening state of each upper rotor wing 10 and each lower rotor wing 11 is realized by the cooperation of the upper rotor wing fixing marble 23 and the upper rotor wing fixing hole 22 as well as the cooperation of the lower rotor wing fixing marble 31 and the lower rotor wing fixing hole 30, as shown in FIG. 1; when each upper rotor wing 10 and each lower rotor wing 11 are opened, the sonde body keeps falling vertically. Each upper rotor wing 10 and each lower rotor wing 11 have the opposite inclination directions, so each upper rotor wing 10 and each lower rotor wing 11 generate the opposite airflow under the effect of the external environment, each upper rotor wing 10 and each lower rotor wing 11 have the opposite rotation direction, so the air resistance may be increased, so that the sonde may obtain longer hang time. Moreover, through the cooperation of each upper dip angle adjusting marble 19 and the upper angle limiting hole 20, the cooperation of each lower dip angle adjusting marble 27 and the lower angle limiting hole 28 and adjustment of the inclination angle of each upper rotor wing 10 and each lower rotor wing 11, the descending speed of the sonde may be controlled, so that the sonde can obtain the ideal hang time. In addition, the resistance value of the simulated resistor may be adjusted by the micro controller, so as to change the received relative torque when each upper rotor ring 10 and each lower rotor wing 11 rotate and change the relative rotation speed of each upper rotor ring 10 and each lower rotor wing 11, thereby realizing the control of the descending speed of the sonde and obtaining the ideal hang time for the sonde.

The dropsonde provided by the present disclosure adopts a dandelion-like structure. In a bad environment, such as the typhoon, the upper and lower rotor wings of the sonde are easily damaged, even a small amount of rotor wings are damaged, the normal use of the sonde can be ensured. Therefore, dropsonde is suitable for detecting the bad environment, such as the typhoon. When the upper and lower rotor wings are closed, the sonde is launched to a predetermined height. During a launching process, the upper and lower rotor wings are closed so that the sonde body is easier to keep the straight flight. After the sonde reaches the predetermined height, the upper and lower rotor wings may be opened automatically, and then fall slowly. An upper and lower double-layer rotor wing structure is adopted, and the upper and lower rotor wings have the opposite inclination directions and generate the opposite airflow under the effect of an external environment, so that the upper and lower rotor wings have the opposite rotation directions, thereby increasing air resistance and obtaining longer hang time for the sonde. Moreover, the descending speed of the sonde is controlled by adjusting the inclination angle of the upper and lower rotor wings, so that the sonde can obtain ideal hang time. In addition, the resistance value of the simulated resistor may be adjusted by the micro controller, so as to change the received relative torque when the upper and lower rotor wings rotate and change the relative rotation speed of the upper and lower rotor wings, thereby realizing the control of the descending speed of the sonde and obtaining the ideal hang time for the sonde.

Preferably, in the dropsonde provided by the present disclosure, the sensor in the sensing main control system may be manufactured by adopting a MEMS process, thus the obtained sensor has the advantages of small volume, light weight and the like and meets the structure design of the sonde, moreover, the detection for four physical parameters, including temperature, humidity, wind power and air pressure can be realized. Specifically, the sensor can obtain the position information of the sonde in real time by GPS.

Preferably, to make a more stable descending state of the sonde, the inclination angle of each upper rotor wing may be the same in the dropsonde provided by the present disclosure.

Similarly, to make a more stable descending state of the sonde, the inclination angle of each lower rotor wing may be the same in the dropsonde provided by the present disclosure.

During the specific implementation, in the dropsonde provided by the present disclosure, the specific shape of the restraint frame may be as follows: as shown in FIG. 8, a spherical crown is enclosed by the restraint frame 34 and the restraint ring 32, and the above shape design of the restraint frame 34 is not only convenient for the fixing connection of the restraint ring 32 and the restraint rod 33, but also not hinders the restraint ring 32 to restrain the upper and lower rotor wings.

Preferably, in the dropsonde provided by the present disclosure, as shown in FIG. 1, a shell of the sensing main control system 4 may be set as a bullet-shape, thus when the upper and lower rotor wings are closed, the whole sonde body is closed to the streamline, so as to reduce the flying resistance of the sonde during the launching process, reduce the kinetic energy loss of the sonde, and reach the predetermined height incapable of being reached by an aerostat without using an aircraft, a meteorological rocket and other carrying devices.

The dropsonde provided by the present disclosure adopts a dandelion-like structure. In a bad environment, such as the typhoon, the upper and lower rotor wings of the sonde are easily damaged, even a small amount of rotor wings are damaged, the normal use of the sonde can be ensured. Therefore, dropsonde is suitable for detecting the bad environment, such as the typhoon. When the upper and lower rotor wings are closed, the sonde is launched to a predetermined height. During a launching process, the upper and lower rotor wings are closed so that the sonde body is easier to keep the straight flight. After the sonde reaches the predetermined height, the upper and lower rotor wings may be opened automatically, and then fall slowly. An upper and lower double-layer rotor wing structure is adopted, and the upper and lower rotor wings have the opposite inclination directions and generate the opposite airflow under the effect of an external environment, so that the upper and lower rotor wings have the opposite rotation directions, thereby increasing air resistance and obtaining longer hang time for the sonde. Moreover, the descending speed of the sonde is controlled by adjusting the inclination angle of the upper and lower rotor wings, so that the sonde can obtain ideal hang time. In addition, the resistance value of the simulated resistor may be adjusted by the micro controller, so as to change the received relative torque when the upper and lower rotor wings rotate and change the relative rotation speed of the upper and lower rotor wings, thereby realizing the control of the descending speed of the sonde and obtaining the ideal hang time for the sonde.

It is apparent that those skilled in the art may make any modification and variation to the present disclosure without deviating from the spirit and scope of the present disclosure. Thus, if these modifications and variations of the present disclosure belong to the scope of the claims and equivalent technology thereof of the present disclosure, the present disclosure is intended to include these modifications and variations.

The invention claimed is:

1. A dropsonde with a dandelion-like structure, comprising a support system (1), a rotor wing system (2), a rotor wing restraint system (3), a sensing main control system (4) and an electrical damping system (5), wherein the support system (1) further comprising a hollow upper strut (6), a hollow lower strut (7), an upper disc (8) fixedly connected to top of the upper strut (6) and a lower disc (9) fixedly connected to top of the lower strut (7), wherein the upper strut (6) is partially inserted into the lower strut (7), and wherein the upper parts of the upper disc (8) and the upper strut (6) are exposed outside the lower strut (7);

wherein the rotor wing system (2) further comprising a plurality of upper rotor wings (10), a plurality of lower rotor wings (11), a plurality of upper springs (12) each corresponds to a said upper rotor wing (10), a plurality of lower springs (13) each corresponds to a said lower rotor wing (11), a plurality of upper connecting members (14) each corresponds to a said upper rotor wing (10) and a plurality of lower connecting members (15) each corresponds to a said lower rotor wing (11), wherein an inclination direction of each upper rotor wing (10) is opposite to that of each lower rotor wing (11); wherein one end of each upper spring (12) is fixedly connected to the corresponding upper rotor wing (10) while another end is fixedly connected to the upper strut (6); wherein one end of each lower spring (13) is fixedly connected to the corresponding lower rotor wing (11) while another end is fixedly connected to the lower strut (7); wherein each upper connecting member (14) further comprising an upper dip angle adjusting rod (16), wherein an upper angle limiting cylinder (17) and an upper rotor wing adjusting ring (18), wherein the upper dip angle adjusting rod (16) in each upper connecting member (14) is fixedly connected to the corresponding upper rotor wing (10), wherein the upper angle limiting cylinder (17) in each upper connecting member (14) is fixedly connected to the upper rotor wing adjusting ring (18), wherein a plurality of upper dip angle adjusting marbles (19) arranged along an extension direction of the upper dip angle adjusting rod (16) are provided on a surface of the upper dip angle adjusting rod (16), wherein a plurality groups of upper angle limiting holes (20) that are arranged along a circumferential direction of the upper angle limiting cylinder (17) are formed in the upper angle limiting cylinder (17), wherein each group of upper angle limiting holes (20) corresponds to an upper dip angle adjusting marble (19), wherein the upper dip angle adjusting rod (16) is inserted into the upper angle limiting cylinder (17), wherein each upper dip angle adjusting marble (19) pops up from one group of upper angle limiting holes (20) to lock an inclination angle of the corresponding upper rotor wing (10), and wherein each upper dip angle adjusting marble (19) pops up from different groups of upper angle limiting holes (20) to adjust the inclination angle of the corresponding upper rotor wing (10); wherein a plurality of upper connecting holes (21) corresponding to each upper rotor wing adjusting ring (18) are formed at a position where the upper disc (8) closes to an edge, wherein each upper rotor wing adjusting ring (18) is rotationally connected to the upper disc (8) through the corresponding upper connecting hole (21), wherein each upper rotor wing adjusting ring (18) is provided with an upper rotor wing fixing hole (22), wherein the upper disc (8) is provided with a plurality of upper rotor wing fixing marbles (23) each corresponds to an said upper rotor wing fixing hole (22), and wherein each upper rotor wing fixing marble (23) pops up from the corresponding upper rotor wing fixing hole (22) lock an opening state of the corresponding upper rotor wing (10); wherein each lower connecting member (15) further comprising an lower dip angle adjusting rod (24), a lower angle limiting cylinder (25) and a lower rotor wing adjusting ring (26), wherein the lower dip angle adjusting rod (24) in each lower connecting member (15) is fixedly connected to the corresponding lower rotor wing (11), wherein the lower angle limiting cylinder (25) in each lower connecting member (15) is fixedly connected to the lower rotor wing adjusting ring (26), wherein a plurality of lower dip angle adjusting marbles (27) arranged along an extension direction of the lower dip angle adjusting rod (24) are provided on the surface of the lower dip angle adjusting rod (24), wherein a plurality groups of lower angle limiting holes (28) arranged along a circumferential direction of the lower angle limiting cylinder (25) are formed in the lower angle limiting cylinder (25), wherein each group of lower angle limiting holes (28) corresponds to a said lower dip angle adjusting marble (27), wherein the lower dip angle adjusting rod (24) is inserted into the lower angle limiting cylinder (25), wherein each lower dip angle adjusting marble (27) pops up from one group of lower angle limiting holes (28) to lock the inclination angle of the corresponding lower rotor wing (11), and wherein each lower dip angle adjusting marble (27) pops up from different groups of lower angle limiting holes (28) adjust the inclination angle of the corresponding lower rotor wing (11); wherein a plurality of lower connecting holes (29) corresponds to a said lower rotor wing adjusting ring (26) are formed at a position where the lower disc (9) closes to an edge, wherein each lower rotor wing adjusting ring (26) is rotationally connected to the lower disc (9) through the corresponding lower connecting hole (29), wherein each lower rotor wing adjusting ring (26) is provided with a lower rotor wing fixing hole (30), wherein the lower disc (9) is provided with a plurality of lower rotor wing fixing marbles (31) each corresponds to a said lower rotor wing fixing hole (30), and wherein each lower rotor wing fixing marble (31) pops up from the corresponding lower rotor wing fixing hole (30) to lock an opening state of the corresponding lower rotor wing (11);

wherein the rotor wing restraint system (3) further comprising a restraint ring (32), a restraint rod (33), a restraint frame (34), through which the restraint ring (32) is fixedly connected to top of the restraint rod (34), a straight tooth (35) fixedly connected to the bottom of the restraint rod (33), a gear (36) meshing with the straight tooth (35), a stepping motor (37) fixedly connected to the gear (36), and a restraint controller (38) electrically connected to the stepping motor (37), wherein the restraint rod (33) is partially inserted into the upper strut (6), wherein upper parts of the restraint ring (32), the restraint frame (34) and the restraint rod (33) are exposed outside the upper strut (6), wherein the straight tooth (35), the gear (36), the stepping motor (37) and the restraint controller (38) are located inside the upper strut (6), and wherein an outer wall of the restraint controller (38) is fixedly connected to an inner wall of the upper strut (6); wherein the restraint controller (38) is configured to control the rotation of the stepping motor (37) under the control of the sensing main control system (4) and to drive the gear (36) to rotate, wherein the restraint ring (32) is driven to move away from or closely to the rotor wing system (2) through meshing drive of the gear (36) and the straight tooth (35) to open each upper rotor wing (10) and each lower rotor wing (11) or to lock a closing state of each upper rotor wing (10) and each lower rotor wing (11);

wherein the sensing main control system (4) is fixedly connected to the bottom of the lower strut (7) and further comprising a sensor and a micro controller which are connected electrically, wherein the sensor is configured to collect position information of the sonde in real time, to collect temperature information, humidity information, wind information and atmospheric pressure information after the sonde is confirmed to reach a predetermined height and to send these information to the micro controller; wherein the micro controller is configured to send a control signal to the restraint controller (38) after the sonde reaches the predetermined height, wherein the restraint controller (38) controls the rotation of the stepping motor (37) and drives the gear (36) to rotate, the restraint ring (32) is driven to move away from the rotor wing system (2) through meshing drive of the gear (36) and the straight tooth (35) to open each upper rotor wing (10) and each lower rotor wing (11) and send the received temperature information, humidity information, wind information and atmospheric pressure information to the ground; and wherein the electrical damping system (5) further comprising a DC motor (39) located in the lower strut (7) and a simulated resistor accessed in a coil of the DC motor (39), wherein a rotary shaft of the DC motor (39) is fixedly connected to the bottom of the upper strut (6) by a connector (40), and wherein an outer wall of the DC motor (39) is fixedly connected to an inner wall of the lower strut (7); and wherein a control end of the simulated resistor is electrically connected to the micro controller, configured to control the descending speed of the sonde by controlling a resistance value of the simulated resistor.

2. The dropsonde according to claim 1, wherein each upper rotor wing (10) has same inclination angle.

3. The dropsonde according to claim 2, wherein a shell of the sensing main control system (4) is bullet-shaped.

4. The dropsonde according to claim 1, wherein each lower rotor wing (11) has same inclination angle.

5. The dropsonde according to claim 4, wherein a shell of the sensing main control system (4) is bullet-shaped.

6. The dropsonde according to claim 1, wherein a spherical crown structure is enclosed by the restraint frame (34) and the restraint ring (32).

7. The dropsonde according to claim 6, wherein a shell of the sensing main control system (4) is bullet-shaped.

8. The dropsonde according to claim 1, wherein a shell of the sensing main control system (4) is bullet-shaped.

* * * * *